Patented Dec. 6, 1949

2,490,202

UNITED STATES PATENT OFFICE 2,490,202

INSECTICIDAL COMPOSITION COMPRISING A POLYCHLORO BRANCHED-CHAIN HYDROCARBON

George Allen Buntin, Wilmington, Del., assignor to Hercules Powder Company, Wilmington, Del., a corporation of Delaware No Drawing. Application June 18, 1947, Serial No. 755,485

9 Claims. (Cl. 167—22)

1

This invention relates to insecticidal compositions and more particularly to insecticidal compositions containing a polychloro branched-chain hydrocarbon as the toxic ingredient.

Among the more commonly used insecticidal toxicants are the naturally occurring products, pyrethrum, rotenone and nicotine. These natural products have the very great disadvantage of not being uniform in their insecticidal activity. Many synthetic products have been suggested in the past as substitutes for these toxicants, however, they are usually lacking in one respect or another. They do not have a high enough killing power and must be used in concentrations which cause irritation to the user, or if they are sufficiently toxic, they are also toxic to forms of animal life other than insect pests.

Now in accordance with this invention it has been found that insecticidal compositions containing as a toxic ingredient a polychloro branched-chain hydrocarbon, having a chlorine content of from about 60% to about 80% of chlorine and being a chloro derivative of a branched-chain hydrocarbon in which at least 1 alkyl radical is attached to a straight chain of from 4 to 6 carbon atoms, the total number of carbon atoms in the molecule being equal to at least 6, possess a high degree of insecticidal activity.

The following examples will illustrate the preparation of these polychloro branched-chain hydrocarbons and the insecticidal activity of compositions containing them.

EXAMPLE I

One part of isooctene (diisobutylene or 2,4,4-trimethylpentene-2) dissolved in 5 parts of carbon tetrachloride was placed in a chlorination vessel and exposed to ultraviolet illumination. Chlorine was passed into the agitated mixture at a rate that allowed for maximum absorption of the chlorine. After 6 hours of chlorination, samples were taken about every 6 hours, a total of 5 samples being removed. The carbon tetrachloride was removed from each sample by distillation under reduced pressure. A viscous yellow liquid remained in each case.

The 5 chlorinated isooctene materials were tested for their insecticidal activity against house flies. In this and the following examples, the test for insecticidal activity against house flies was made in the following manner and is referred to in this specification as the Bell jar method.

Approximately 100 five-day old flies (*Musca domestica*) were placed in a bell jar and a predetermined quantity of the insecticide to be tested was atomized into the bell jar. The quantity of insecticide used was equal to the amount of an official test insecticide which was necessary to give a 30–55% kill and must be within the limits of 0.4 to 0.6 ml. After spraying the insecticide into the chamber the flies were placed in an observation cage containing a wad of cotton wet with a dilute sugar solution. At the end of 24 hours the number of dead and moribund flies were counted. All tests were carried out at 80–90° F. and 50–70% relative humidity.

The results of the analysis for chlorine content and of tests made on 5% solutions in deodorized kerosene of the above 5 polychloro isooctanes are given in the following table. The data is an average of a series of tests made on each solution.

Bell jar tests on flies

| Per Cent Chlorine | Per Cent Dead in 24 Hrs. | O. T. I. Difference |
|---|---|---|
| 54.3 | 17 | −10 |
| 62.0 | 56 | +29 |
| 66.9 | 88 | +61 |
| 70.2 | 93 | +66 |
| 72.7 | 98 | +71 |

EXAMPLES II–VIII

A number of other branched-chain hydrocarbons were chlorinated by the procedure described in Example I. The results of insecticidal tests made on solutions of these polychloro branched-chain hydrocarbons are given in the following table. The data in each instance is an average of a series of tests made on each solution.

Bell jar tests on flies

| Example No. | Compound Chlorinated | Per Cent Chlorine | Per Cent Solution in Deodorized Kerosene | Per Cent Dead in 24 Hrs. | O. T. I. Difference |
|---|---|---|---|---|---|
| II | 2,3-Dimethylpentane | 60.5 | 10 | 98 | +43 |
|  |  |  | 5 | 98 | +43 |
|  |  | 72.8 | 10 | 96 | +46 |
|  |  |  | 5 | 92 | +42 |
| III | 2,2-Dimethylbutane | 72.3 | 10 | 100 | +42 |
|  |  |  | 5 | 99 | +41 |
|  |  |  | 2.5 | 95 | +37 |
|  |  | 74.3 | 10 | 100 | +42 |
|  |  |  | 5 | 100 | +42 |
|  |  |  | 2.5 | 99 | +41 |
| IV | 3-Methylpentane | 68.5 | 10 | 91 | +38 |
|  |  | 72.5 | 10 | 100 | +47 |
| V | 2,2,5-Trimethylhexane | 64.0 | 10 | 76 | +18 |
|  |  | 70.7 | 10 | 89 | +31 |
| VI | 2,3-Dimethylbutane | 71.8 | 10 | 99 | +53 |
|  |  | 76.2 | 10 | 80 | +34 |
| VII | 2,4-Dimethylpentane | 73.8 | 10 | 74 | +29 |
| VIII | Triisobutylene (2,4,4-Trimethyl-3-tert.-butyl-pentene-2) | 62.1 | 10 | 96 | +55 |
|  |  | 70.6 | 10 | 79 | +38 |

The polychloro branched-chain hydrocarbons used as the toxic ingredient of insecticidal compositions in accordance with this invention are those containing an amount of chlorine of from about 60% to about 80%, and preferably those containing from about 65% to about 75% chlorine. The polychloro branched-chain hydrocarbon may be a single compound or a mixture of polychloro branched-chain hydrocarbons which have an average chlorine content of from about 60% to about 80%. Those compounds having a chlorine content higher or lower than this range are too inactive to be of any value as the toxic ingredient of insecticidal compositions.

In addition to the above-specified chlorine content, the polychloro hydrocarbons, which are the toxic ingredients of the insecticidal compositions of this invention, are further limited to those having a branched-chain carbon structure. They may be defined as being chloro derivatives of branched-chain hydrocarbons in which at least 1 alkyl radical is attached to a straight chain of from 4 to 6 carbon atoms, the total number of carbon atoms in the molecule being equal to at least 6 and preferably from 6 to 12 carbon atoms. Polychloro branched-chain hydrocarbons containing less than 6 carbon atoms are too inactive as the toxic ingredients of insecticidal compositions to be of value. The branched-chain arrangement of the carbon structure is also an essential for insecticidal activity. This branched-chain-arrangement may consist of any straight chain of from 4 to 6 carbon atoms in which at least 1 and preferably from 1 to 4 alkyl radicals, such as methyl, ethyl, isopropyl, tert.-butyl, etc., radicals are attached. The number of alkyl radicals attached is dependent upon the length of the straight chain and the alkyl groups which are attached depend upon the length of the straight chain and the position of attachment. Thus in the case of the compounds having a straight chain of 4 carbons, from 2 to 4 methyl groups may be attached. In the case of the compounds having 5 carbon atoms in a straight chain, there may be from 1 to 6 alkyl groups attached and the alkyl groups may be methyl, ethyl, isopropyl or tert.-butyl radicals depending upon the position of attachment. The 6 carbon straight-chain compounds may have from 1 to 8 alkyl groups which may be methyl, ethyl, isopropyl or tert.-butyl radicals depending upon the position of attachment. Typical of the polychloro acyclic hydrocarbons having the requisite branched-chain structure are the polychloro derivatives of 2,2-dimethylbutane; 2,3-dimethylbutane; 3-methylpentane; 2,3-dimethylpentane; 2,4-dimethylpentane; isooctane (2,2,4-trimethylpentane); triisobutane (2,2,4-trimethyl-3-tert. - butylpentane); 2,2,5-trimethylhexane, etc. The insecticidal activity of insecticidal compositions containing these compounds as the toxic ingredient has been illustrated in the foregoing examples.

The polychloro hydrocarbons may be prepared by any of the usual methods used for the preparation of chloro compounds in general. They are most readily prepared by chlorinating the corresponding hydrocarbon, as, for example, the polychloro butanes of this invention may be prepared by chlorinating 2,2-dimethylbutane, 2,3-dimethylbutane, etc., or the corresponding butenes, etc., and the polychloro pentanes may be prepared by chlorinating 3-methylpentane; 2,3-dimethylpentane; 2,4-dimethylpentane; isooctane; triisobutane; etc.; or the corresponding olefins, etc. The chlorination may be carried out in the presence or absence of a solvent. Lower temperatures are maintained during the chlorination if a solvent is used; however, in some instances it is preferable to use high temperatures in order to obtain the desired degree of chlorination. Suitable solvents for the chlorination are chloroform, carbon tetrachloride, pentachloroethane, etc. A chlorination catalyst may be used if desired, ultraviolet light being particularly effective.

The insecticidal compositions of this invention may be made up of the polychloro compound admixed with any type of diluent. If a liquid spray is desired, the polychloro compound may be dissolved in any convenient solvent, such as deodorized kerosene, or it may be dispersed in water to form aqueous sprays. Insecticidal dusts may be prepared by placing the polychloro compound on a diluent or carrier such as powdered carbon, kieselguhr, bentonite, pyrophyllite, etc.

For many purposes it may be desired to use the polychloro branched-chain hydrocarbons in combination with other insecticidal toxicants. Many toxicants have a very high knockdown in relatively dilute solutions, but higher concentrations must be used in order to obtain the desired degree of kill. Due to the high degree of killing power which the polychloro branched-chain hydrocarbons possess, these compounds may be added to such toxicants, thereby enabling the use of much more dilute solutions than would otherwise be possible. Toxicants with which these polychloro hydrocarbons may be combined include such compounds as rotenone, pyrethrum and organic thiocyanates such as alkyl thiocyanates, thiocyano ethers such as beta-butoxy-beta'-thiocyanoethyl ether, and terpene thiocyanoacylates such as isobornyl thiocyanoacetate, fenchyl thiocyanoacetate and isobornyl alpha-thiocyanopropionate.

The insecticidal compositions of this invention may contain any amount of the polychloro branched-chain hydrocarbon that is effective against the pest being killed. For use as a household fly spray, 1% to 10% in deodorized kerosene may be used. However, for killing many types of pests it will be desirable to use much higher concentrations of these toxicants.

The insecticidal compositions of this invention are useful in combatting flies, mosquitoes, roaches, moths, and many other pests.

This application is a continuation-in-part of my application for United States Letters Patent Serial No. 676,591, filed June 13, 1946, now abandoned.

What I claim and desire to protect by Letters Patent is:

1. An insecticidal composition comprising a polychloro branched-chain hydrocarbon and a diluent, the polychloro compound containing from about 60% to about 80% of chlorine and being a chloro derivative of a branched-chain hydrocarbon in which at least one alkyl radical is attached to a straight chain of from 4 to 6 carbon atoms, the total number of carbon atoms in the molecule being equal to from 6 to 12.

2. An insecticidal composition comprising a polychloro branched-chain hydrocarbon and a diluent, the polychloro compound containing from about 65% to about 75% of chlorine and being a chloro derivative of a branched-chain hydrocarbon in which at least one alkyl radical is attached to a straight chain of from 4 to 6 carbon atoms, the total number of carbon atoms in the molecule being equal to from 6 to 12.

3. An insecticidal composition comprising a polychloro branch-chain hydrocarbon and a diluent, the polychloro compound containing from about 65% to about 75% of chlorine and being a chloro derivative of a branched-chain hydrocarbon in which from 1 to 4 alkyl radicals are attached to a straight chain of from 4 to 6 carbon atoms, the total number of carbon atoms in the molecule being equal to from 6 to 12.

4. An insecticidal composition comprising a polychloro-isooctane, containing from about 60% to about 80% of chlorine and a diluent.

5. An insecticidal composition comprising a polychloro-2,3-dimethylpentane, containing from about 60% to about 80% of chlorine, and a diluent.

6. An insecticidal composition comprising a polychloro-2,2-dimethylbutane, containing from about 60% to about 80% of chlorine, and a diluent.

7. An insecticidal composition comprising a polychloro-isooctane, containing from about 65% to about 75% of chlorine, and a diluent.

8. An insecticidal composition comprising a polychloro-2,3-dimethylpentane, containing from about 65% to about 75% of chlorine, and a diluent.

9. An insecticidal composition comprising a polychloro-2,2-dimethylbutane, containing from about 65% to about 75% of chlorine, and a diluent.

GEORGE ALLEN BUNTIN.

REFERENCES CITED

The following references are of record in the file of this patent:

UNITED STATES PATENTS

| Number | Name | Date |
| --- | --- | --- |
| 2,010,841 | Bender | Aug. 13, 1935 |
| 2,209,184 | Borglin | July 23, 1940 |
| 2,419,021 | Harnden | Apr. 15, 1947 |

OTHER REFERENCES

Tischenko, J. Gen. Chem. (U. S. S. R.), vol. 6, pages 1116–1132 (1936), through Chem. Abst., vol. 31, page 1003.

Schmerling, J. A. C. S., vol. 68, pages 1650–1657 (1946).

Roark et al., Dept. of Agriculture Technical Bulletin No. 162, March 1929, page 10.